Mar. 5, 1929.  C. C. FARMER  1,703,876
BRAKE CYLINDER DEVICE
Filed Oct. 14, 1927
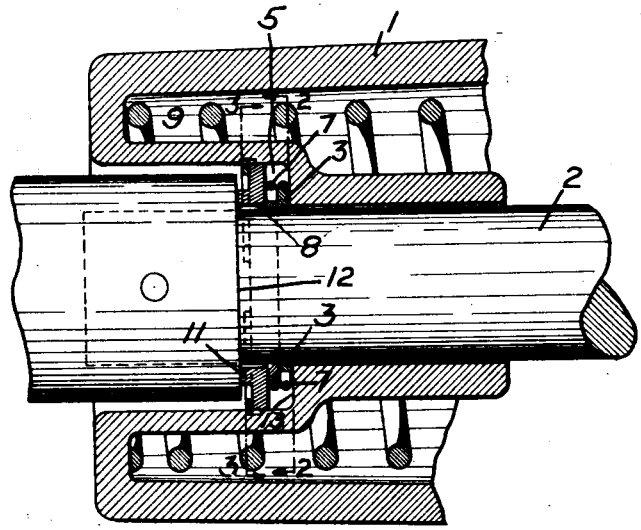
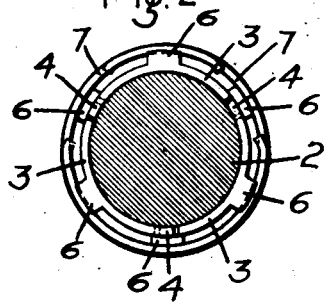
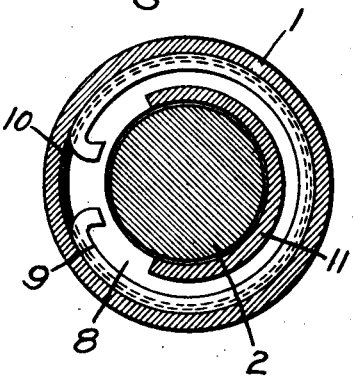
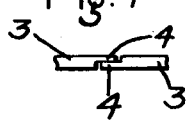
INVENTOR
CLYDE C. FARMER
BY *Wm. H. Cady*
ATTORNEY Patented Mar. 5, 1929.

1,703,876

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-CYLINDER DEVICE.

Application filed October 14, 1927. Serial No. 226,127.

This invention relates to brake cylinders such as employed with railway brake systems, and the principal object of my invention is to provide improved means for preventing the entrance at the non-pressure side of the brake cylinder of water, snow, dirt or other foreign matter.

In the accompanying drawing; Fig. 1 is a sectional view of a portion of the non-pressure end of a brake cylinder, showing my improvement applied; Fig. 2 a section on the line 2—2 of Fig. 1; Fig. 3 a section on the line 3—3 of Fig. 1; and Fig. 4 a detail fragmentary view, showing one of the segmentary ring joints.

In the drawing is shown a portion 1 of the non-pressure head of a brake cylinder having the usual opening through which extends the usual piston rod 2.

According to my invention, rings, preferably two in number and preferably of bronze metal are provided, each ring being formed of a plurality of segments 3, preferably three in number and each segment having a step joint at the opposite ends, as shown in Fig. 4, and the tongue 4 of one segment engaging the tongue 4 of the adjacent segment, so that radial movement of the segments is permitted, while leakage past each ring is prevented by the engagement of the flat cooperating faces of the tongues.

The rings are mounted to engage the piston rod 2 and are disposed within the recessed chamber 5 provided at the outer end of the non-pressure head portion 1.

Each segment 3 is provided with an outwardly extended grooved lug 6, and when the segments of each ring have been applied in position, an open ended spring ring 7 is sprung into the grooves of the lugs 6, so that the spring 7 of each segment ring yieldingly presses the segments into engagement with the piston rod.

The segment rings are held in position against longitudinal movement by means of a retaining ring or annulus 8. The retaining ring 8 is held in place by means of an open ended spring locking ring 9, which is adapted to be sprung into an annular recess 10 formed in the wall of the chamber 5. The ring 8 bears against the wall of chamber 5 and is provided with a clearance space between the piston rod 2 and the ring, so as to permit a limited lateral movement of the piston rod.

The ring 8 is provided with a flange 11, which is partly cut away, so that when the piston rod 2 moves to its full release position, the shoulder 12 will engage said flange and ensure that the segment rings are pressed tightly in engagement against the shoulder 13, so as to prevent flow of air from the atmosphere into the chamber at the non-pressure side of the brake cylinder, and a tight joint around the piston rod 2 is maintained by the engagement of the segments 3 of the segment rings with the rod.

By making the rings in segments and subjecting the segments to spring pressure, the segments automatically adjust themselves for wear, so that a tight joint at the piston rod is always maintained.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a brake cylinder having a non-pressure head and a piston rod extending through an opening in said head and a ring formed of a plurality of segments disposed in said head and engaging said rod.

2. In a brake cylinder having a non-pressure head and a piston rod extending through an opening in said head, a ring disposed in said head and formed of a plurality of segments, and means for yieldingly pressing said segments into engagement with said rod.

3. In a brake cylinder having a non-pressure head and a piston rod extending through an opening in said head, a ring disposed in said head and formed of a plurality of segments, and a split spring ring for pressing said segments into engagement with said rod.

4. In a brake cylinder having a non-pressure head and a piston rod extending through an opening in said head, a pair of engaging rings disposed in said head and each formed of a plurality of segments, and means for yieldingly pressing the segments of each ring into engagement with said rod.

5. In a brake cylinder having a non-pressure head and a piston rod extending through an opening in said head, a pair of engaging rings disposed in said head and each formed of a plurality of segments, means for yieldingly pressing the segments of each ring into engagement with said rod, and means for preventing longitudinal movement of said rings.

6. In a brake cylinder having a non-pressure head and a piston rod extending through an opening in said head, a ring disposed in said head and formed of a plurality of segments, each segment having tongues engaging the tongues of adjacent segments to form step joints between the segments, and means for yieldingly pressing said segments into engagement with said piston rod.

7. In a brake cylinder having a non-pressure head and a piston rod extending through an opening in said head, a ring disposed in said head and formed of a plurality of segments, each segment being provided with a lug, and a split spring ring engaging the lugs of said segments for pressing the segments into engagement with the piston rod.

8. In a brake cylinder having a non-pressure head and a piston rod extending through an opening in said head, a ring disposed in said head and formed of a plurality of segments, each segment being provided with a grooved lug, and a split spring ring engaging in the grooves of said lugs for pressing the segments into engagement with said piston rod.

In testimony whereof I have hereunto set my hand.

CLYDE C. FARMER.